US012785159B2

(12) United States Patent
Kambham et al.

(10) Patent No.: US 12,785,159 B2
(45) Date of Patent: Nov. 3, 2026

(54) POWER STATE TRANSITION FOR WIRELESS TRANSCEIVER

(71) Applicant: Texas Instruments Incorporated, Dallas, TX (US)

(72) Inventors: Taraka Rama Chandra Reddy Kambham, Freising (DE); Ariton Xhafa, Plano, TX (US); Tahar Allag, Irving, TX (US); Mario Mlynek, Munich (DE)

(73) Assignee: TEXAS INSTRUMENTS INCORPORATED, Dallas, TX (US)

(*) Notice: Subject to any disclaimer, the term of this patent is extended or adjusted under 35 U.S.C. 154(b) by 196 days.

(21) Appl. No.: 18/604,687

(22) Filed: Mar. 14, 2024

(65) Prior Publication Data

US 2024/0222716 A1 Jul. 4, 2024

Related U.S. Application Data

(63) Continuation of application No. 17/515,002, filed on Oct. 29, 2021, now Pat. No. 11,942,609.

(51) Int. Cl.

*H01M 10/42* (2006.01)
*H01M 10/48* (2006.01)
*H04B 1/38* (2015.01)

(52) U.S. Cl.

CPC ..... *H01M 10/4257* (2013.01); *H01M 10/482* (2013.01); *H01M 2010/4271* (2013.01); *H04B 1/38* (2013.01)

(58) Field of Classification Search

CPC ........... H01M 10/4257; H01M 10/482; H01M 2010/4271; H04B 1/38; Y02D 30/70
See application file for complete search history.

(56) References Cited

U.S. PATENT DOCUMENTS

| | | | | |
|---|---|---|---|---|
| 2014/0355781 | A1* | 12/2014 | Eckardt ................ | H04R 25/558 381/74 |
| 2019/0260095 | A1 | 8/2019 | Machida et al. | |
| 2020/0142004 | A1 | 5/2020 | Ito et al. | |
| 2020/0266647 | A1 | 8/2020 | Ramachandran et al. | |
| 2020/0288395 | A1 | 9/2020 | Doherty et al. | |
| 2021/0410222 | A1* | 12/2021 | Numata ............... | G01R 31/396 |

FOREIGN PATENT DOCUMENTS

| | | | |
|---|---|---|---|
| EP | 3536541 | A1 | 9/2019 |
| KR | 20160026469 | A | 3/2016 |

* cited by examiner

*Primary Examiner* — Victoria H Lynch
(74) *Attorney, Agent, or Firm* — Carl G. Peterson; Frank D. Cimino

(57) ABSTRACT

A system includes a battery pack having a first battery module, a second battery module, and a busbar that couples the first and second battery modules; a battery management controller having a first wireless transceiver; and a battery monitor coupled to the first battery module and to the busbar. The battery monitor includes monitoring circuitry configured to receive a first indication of a parameter of the first battery module; a second wireless transceiver configured to provide the first indication to the battery management controller via a wireless connection to the first wireless transceiver; and a busbar voltage circuit configured to receive a second indication of a voltage across the busbar, and, responsive to the second indication being greater than a voltage threshold, provide a first signal to the second wireless transceiver to cause the second wireless transceiver to be in a higher-power state.

20 Claims, 3 Drawing Sheets

POWER STATE TRANSITION FOR WIRELESS TRANSCEIVER

CROSS-REFERENCE TO RELATED APPLICATIONS

This application is a continuation of U.S. patent application Ser. No. 17/515,002, filed Oct. 29, 2021, currently pending and scheduled to grant as U.S. Pat. No. 11,942,609 on Mar. 26, 2024, which is incorporated by reference herein in its entirety.

BACKGROUND

A battery pack includes multiple battery modules connected in series. A busbar couples adjacent battery modules (e.g., couples a positive terminal of a first battery module to a negative terminal of a second battery module, or vice versa). Such battery packs provide power for electronic devices, such as electric vehicles (EVs) or hybrid EVs (HEVs), among other devices.

SUMMARY

In an example of this description, a system includes a battery pack having a first battery module, a second battery module, and a busbar that couples the first and second battery modules; a battery management controller having a first wireless transceiver; and a battery monitor coupled to the first battery module and to the busbar. The battery monitor includes monitoring circuitry configured to receive a first indication of a parameter of the first battery module; a second wireless transceiver configured to provide the first indication to the battery management controller via a wireless connection to the first wireless transceiver; and a busbar voltage circuit configured to receive a second indication of a voltage across the busbar, and, responsive to the second indication being greater than a voltage threshold, provide a first signal to the second wireless transceiver to cause the second wireless transceiver to be in a higher-power state.

In another example of this description, a method includes receiving, by a battery monitor, a first indication of a voltage across a busbar that couples a first battery module of a battery pack to a second battery module of the battery pack; responsive to the first indication being greater than a voltage threshold, causing a wireless transceiver of the battery monitor to be in a higher-power state; and wirelessly providing, by the battery monitor to a battery management controller, responsive to the wireless transceiver being in the higher-power state, a second indication of a parameter of the first battery module.

In yet another example of this description, a device includes monitoring circuitry adapted to be coupled to a first battery module of a battery pack. The monitoring circuitry is configured to receive a first indication of a parameter of the first battery module. The device also includes a busbar voltage circuit adapted to be coupled to a busbar that couples the first battery module to a second battery module of the battery pack. The busbar voltage circuit is configured to receive a second indication of a voltage across the busbar, and, responsive to the second indication being greater than a voltage threshold, provide a first signal to a wireless transceiver to cause the wireless transceiver to be in a higher-power state.

BRIEF DESCRIPTION OF THE DRAWINGS

For a detailed description of various examples, reference will now be made to the accompanying drawings in which.

DETAILED DESCRIPTION

Figure 1:
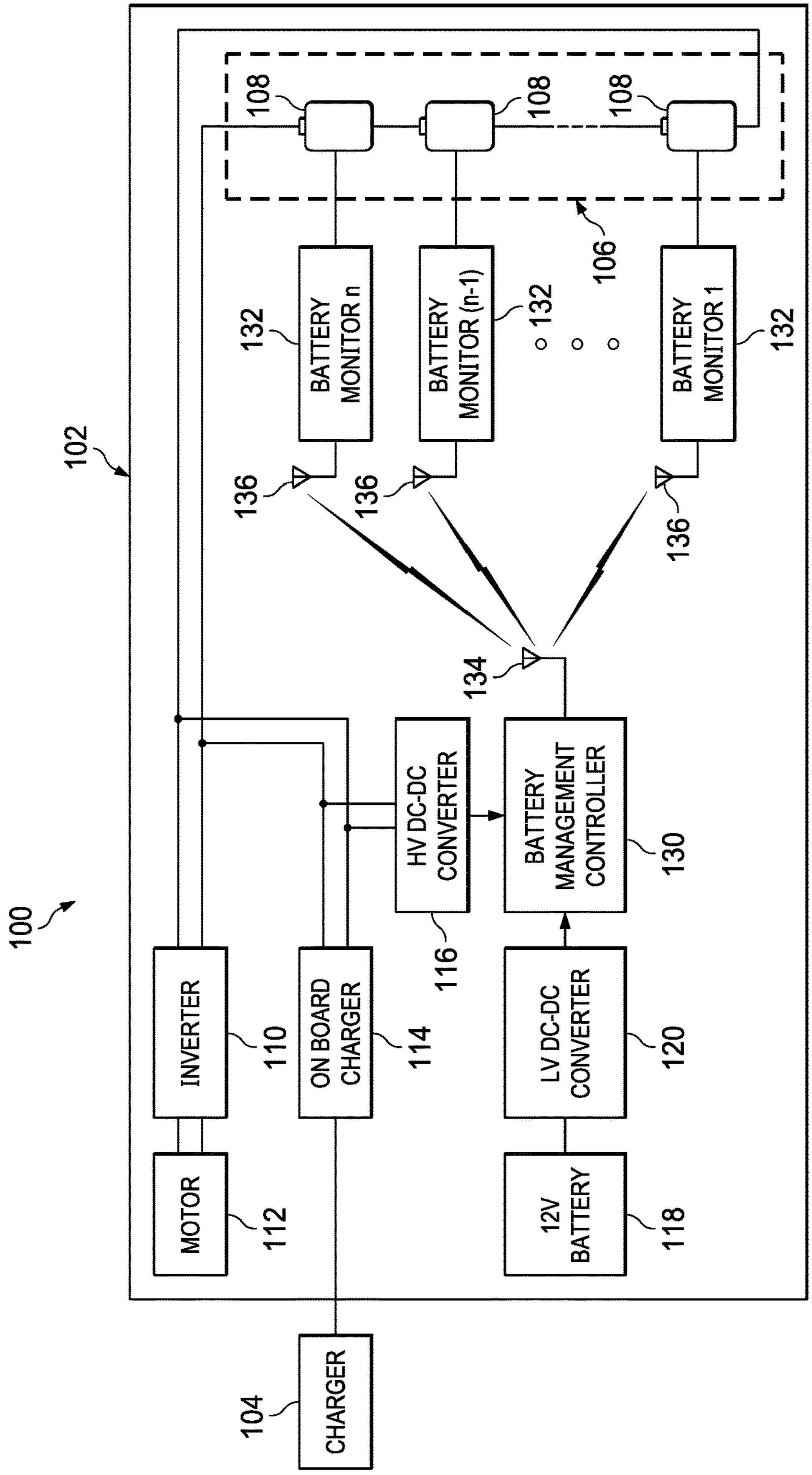
FIG. 1 is a block diagram of a system including a battery management system (BMS) in accordance with an example of this description.

A battery management system (BMS) obtains data related to battery modules of a battery pack, and controls the battery modules of the battery pack. For example, the BMS controls charging of the battery modules, performs balancing between the battery modules, and monitors the operating conditions and/or health of the battery modules. The BMS includes a plurality of battery monitors, and each battery module is coupled to one of the battery monitors. The BMS also includes a battery management controller that is coupled to, and communicates with, each of the battery monitors. Together, the battery monitors and the battery management controller facilitate the monitoring of various parameters of the battery modules, such as voltage, current, temperature, and parameters related to cell balancing within a module, among other functions of the BMS.

In some cases, the battery management controller communicates with the battery monitors using wired connections. However, such a wired BMS is both costly and complicated. A wired BMS is also more difficult to repair in cases where the battery pack (or battery modules thereof) are in locations that are difficult to access, such as may be the case in the context of an EV or HEV.

Accordingly, in other cases, the battery management controller and the battery monitors each includes a wireless transceiver, which facilitates wireless communication between the battery management controller and the battery monitors. In the event that a battery-powered device is in a power save state or mode (e.g., such as an EV or HEV being parked), it is useful to reduce the power consumption of the BMS, while maintaining the ability of the BMS to begin communication relatively quickly responsive to the device transitioning to an on state (e.g., such as the EV or HEV being driven, or otherwise operated by a user).

One way to reduce the BMS power consumption while the device is in the power save mode (e.g., the EV or HEV is parked) is to cause the wireless transceiver of the battery management controller to enter a lower-power state (e.g., to turn off). Other hardware components of the battery management controller, such as a microprocessor, are aware of the state of the device (e.g., whether the vehicle is parked, or a user desires to operate the vehicle), and thus are capable of causing the wireless transceiver of the battery management controller to enter a higher-power state responsive to the device turning on. However, the individual battery monitors are not aware of the device power status. For example, the wireless transceivers of the battery monitors periodically poll or scan to determine whether the wireless transceiver of the battery management controller is in the higher-power state, and/or attempting to communicate with the battery monitors. Accordingly, the wireless transceivers of the battery monitors cannot be turned off while the device is in the power save mode, and thus still consume power to poll or scan for activity from the wireless transceiver of the battery management controller.

Examples of this description address the foregoing by providing battery monitors that include a busbar voltage circuit that is configured to sense a voltage across a busbar that couples battery modules of the battery pack. Each of the battery modules can include one or more battery cells in series. For example, a battery module that includes 12 cells in series is sometimes referred to as a 12S module. The voltage across the busbar being greater than a voltage threshold indicates that current is being drawn from the battery pack, which in turn indicates that the device is transitioning out of the power save mode or state (e.g., the EV or HEV is transitioning from parked to being operated). In an example, the threshold to which the sensed voltage across the busbar is compared is system-dependent.

In some examples, the threshold is based on resistance characteristics of the busbar being monitored, or an expected current drawn from the battery pack while the device is on (e.g., not in the power save state).

The busbar voltage circuit includes an analog-to-digital converter (ADC) that is coupled to the busbar and configured to receive the voltage across the busbar. The ADC provides a digital value responsive to the voltage across the busbar. The busbar voltage circuit also includes a comparator, which compares the digital value indicative of the busbar voltage to the voltage threshold. The comparator provides a wakeup signal to the wireless transceiver of the battery monitor responsive to the digital value being greater than the voltage threshold, which indicates current is being drawn from the battery pack and the device is turning on.

The wireless transceiver of the battery monitor is configured to transition to a higher-power state responsive to receiving the wakeup signal, and to begin communicating with the wireless transceiver of the battery management controller. Because the wireless transceiver of the battery monitor transitions to the higher-power state responsive to a physical condition (e.g., a voltage across the busbar) that indicates the device is itself turning on, the battery monitor is able to begin communicating with the battery management controller relatively quickly (e.g., on the order of 50 ms from busbar voltage sensing to network formation, which can be less than a polling or scanning interval) after the device turns on.

In some examples, the wireless transceiver of the battery monitor is configured to transition to the lower-power state responsive to the wakeup signal being de-asserted (e.g., the busbar voltage being below the voltage threshold, indicating the device is in the power save mode, or EV/HEV is parked). In other examples, the wireless transceiver of the battery monitor is configured to transition to the lower-power state responsive to an instruction or communication from the battery management controller, which is aware of the device transitioning to the power save mode, or EV/HEV being parked. These and other examples are described below with reference to the accompanying figures.

FIG. 1 is a block diagram of a system 100 including a BMS in accordance with an example of this description. The system 100 includes an electronic device 102 (e.g., an EV/HEV 102) that is adapted to be coupled to an external power source 104, which can be an EV charging station 104. The EV/HEV 102 includes a battery pack 106, which includes n battery modules 108 connected in series. Each battery module 108 can include one battery cell, or more than one battery cell connected in series. An inverter 110 is coupled to the battery pack 106, and is configured to receive a direct current (DC) input voltage from the battery pack 106, and to provide an alternating current (AC) output voltage to a load 112 (e.g., a motor 112 of the EV/HEV 102), responsive to the DC input voltage.

The EV/HEV 102 also includes an on-board charger 114 that is coupled to the battery pack 106. The on-board charger 114 is adapted to be coupled to the external power source 104. The on-board charger 114 is configured to convert an input voltage provided by the external power source 104 (e.g., either an AC voltage or a DC voltage) to an output voltage suitable for charging the battery pack 106 (e.g., a DC voltage).

In some examples, the EV/HEV 102 includes a high-voltage (HV) DC-DC power converter 116 that is coupled to the battery pack 106. The HV DC-DC power converter 116 is configured to convert the DC voltage provided by the battery pack 106 to a DC voltage usable by various other components of the EV/HEV 102 (e.g., a lower DC voltage). The EV/HEV 102 also includes a low-voltage (LV) battery 118, such as a 12-volt (V) battery, an 18 V battery, a 40 V battery, or the like. In examples in which the EV/HEV 102 includes an LV battery 118, the EV/HEV 102 also includes an LV DC-DC power converter 120 coupled to the LV battery 118. The LV DC-DC power converter 120 is configured to convert the DC voltage provided by the LV battery 118 to a DC voltage usable by various other components of the EV/HEV 102 (e.g., a lower DC voltage, such as 5 V).

As described, the EV/HEV 102 includes a BMS to obtain data related to the battery modules 108 of the battery pack 106, and to control the battery modules 108 of the battery pack 106. For example, the BMS controls charging of the battery modules 108, performs power balancing between the battery modules 108, and monitors the operating conditions and/or health of the battery modules 108. In the example of FIG. 1, the BMS is a wireless BMS and includes a battery management controller 130 and a stack of battery monitors 132. Each of the battery monitors 132 is associated with, and coupled to, one of the battery modules 108. Accordingly, in the example of FIG. 1, there are n battery monitors 132, each coupled to one of the n battery modules 108.

The battery management controller 130 includes a wireless transceiver 134, and each of the battery monitors 132 includes an associated wireless transceiver 136. The wireless transceiver 134 and the wireless transceiver(s) 136 thus enable wireless communication between the battery management controller 130 and the battery monitor(s) 132. For example, the wireless transceiver 134 of the battery management controller 130 is configured to provide a command and/or a request to the wireless transceiver(s) 136 of the battery monitor(s) 132. Similarly, the wireless transceiver(s) 136 of the battery monitor(s) 132 are configured to provide a response to the wireless transceiver 134 of the battery management controller 130. Accordingly, the BMS including the battery management controller 130 and the battery monitors 132 enables monitoring of various parameters of the battery modules 108, such as voltage, current, temperature, and parameters related to cell balancing within a module, among other functions of the BMS.

Figure 2:
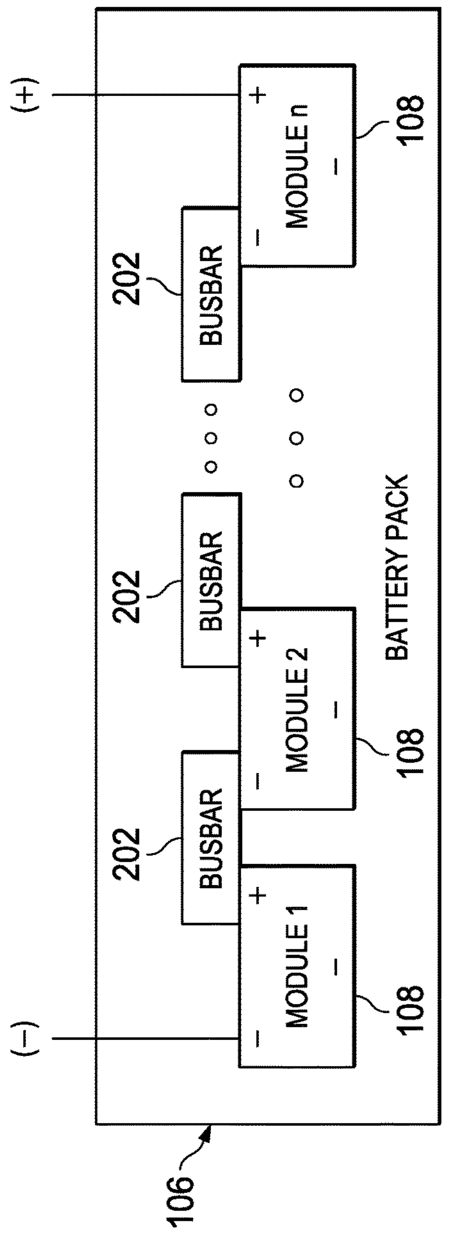
FIG. 2 is a block diagram of a battery pack in accordance with an example of this description.

FIG. 2 is a block diagram of the battery pack 106 of FIG. 1 in accordance with an example of this description. As described above, the battery pack 106 includes n battery modules 108 connected in series. A busbar 202 couples adjacent battery modules 108. For example, a busbar 202 couples a positive terminal of Module 1 to a negative terminal of Module 2, and another busbar 202 couples a positive terminal of Module n-1 to a negative terminal of Module n. In the example of FIG. 2, a negative terminal of Module 1 is also a negative terminal of the battery pack 106, while a positive terminal of Module n is also a positive terminal of the battery pack 106.

As described, the battery monitor(s) 132 are configured to sense a voltage across one of the busbars 202, such as one of the busbars 202 coupled to the battery module 108 that a particular battery monitor 132 monitors. For example, the battery monitor 132 that monitors (or is associated with) Module 1 is configured to sense a voltage across the busbar 202 that couples Module 1 and Module 2 (e.g., the busbar 202 couples first and second battery modules 108). Similarly, the battery monitor 132 that monitors (or is associated with) Module n-1 is configured to sense a voltage across the busbar 202 that couples Module n-1 and Module n. In some examples, more than one battery monitor 132 can be configured to sense a voltage across a same busbar 202.

Figure 3:
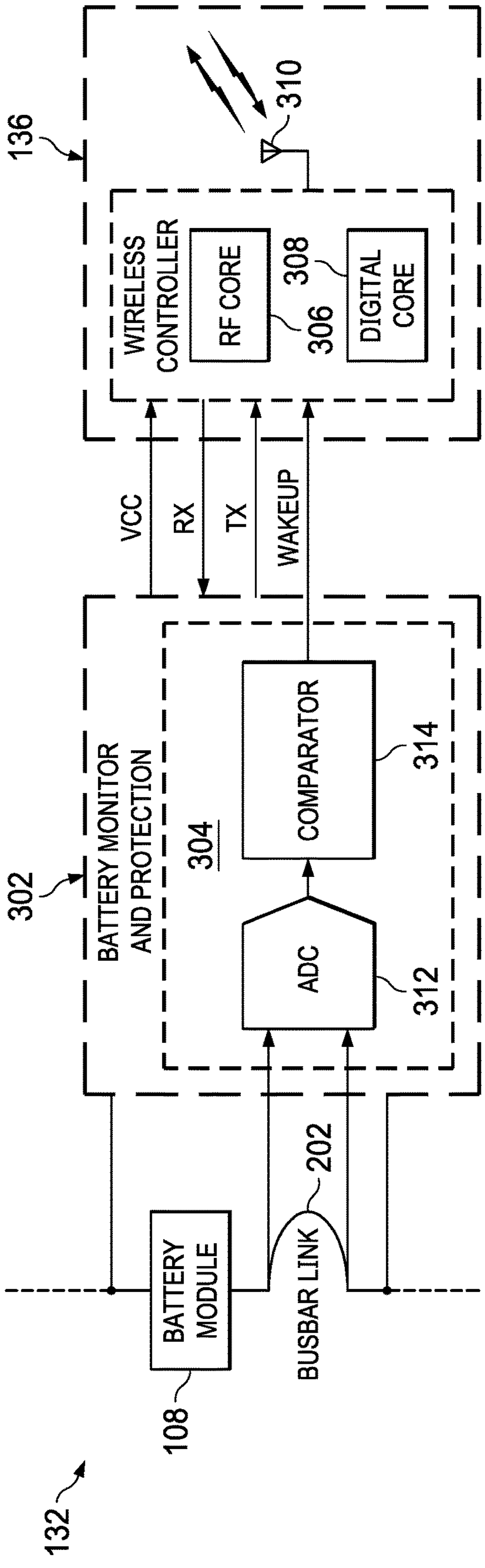
FIG. 3 is a circuit diagram of a battery monitor and wireless transceiver of the BMS of FIG. 1 in accordance with an example of this description.

FIG. 3 is a circuit schematic diagram of a battery monitor 132 and wireless transceiver 136 of the BMS of FIG. 1 in accordance with an example of this description. In some examples, the battery monitor 132 includes the wireless transceiver 136, while in other examples the battery monitor 132 is adapted to be coupled to the wireless transceiver 136. For simplicity, in the examples of FIG. 3, the battery monitor 132 is described as including the wireless transceiver 136.

The battery monitor 132 is coupled to the battery module 108 and to a busbar 202, which is coupled to one of the terminals of the battery module 108 as described above. The battery monitor 132 includes monitoring circuitry 302, which is configured to monitor various parameter(s) of the battery module 108 (e.g., receive indications of the parameter(s)), which can include voltage, current, temperature, and parameters related to cell balancing within the battery module 108. The monitored parameters, or indications thereof, are provided by the monitoring circuitry 302 to the wireless transceiver 136, which in turn provides the indications thereof to the battery management controller 130 (e.g., wirelessly to the wireless transceiver 134 coupled to the battery management controller 130).

The battery monitor 132 (or the monitoring circuitry 302 thereof) also includes a busbar voltage circuit 304, which is configured to receive an indication of the voltage across the busbar 202. The busbar voltage circuit 304 is configured to provide a wakeup signal (e.g., a first signal) to the wireless transceiver 136 responsive to an indication that the voltage across the busbar 202 is greater than a first threshold value. The wakeup signal causes the wireless transceiver 136 to be in (e.g., transition to, or remain in) a higher-power state. In an example, the first threshold value to which the sensed voltage across the busbar 202 is compared is system-dependent. For example, the first threshold value is based on resistance characteristics of the busbar 202 being monitored, or an expected current drawn from the battery module 108 while the device 102 is on, or the EV/HEV 102 is operated (e.g., not in the power save state).

In some examples, the busbar voltage circuit 304 is also configured to provide a sleep signal (e.g., a second signal) to the wireless transceiver 136 responsive to an indication that the voltage across the busbar 202 is less than a second threshold value. The sleep signal causes the wireless transceiver 136 to be in (e.g., transition to, or remain in) a lower-power state. In some examples, the second threshold value is equal to the first threshold value, while in other examples, the second threshold value is less than the first threshold value (e.g., to provide a hysteretic control response).

The busbar voltage circuit 304 includes an analog-to-digital converter (ADC) 312 that is coupled to the busbar 202 and configured to receive the voltage across the busbar 202 (e.g., which is related to a current provided by the battery module 108 and the resistance of the busbar 202). The ADC 312 provides a digital value responsive to the voltage across the busbar 202. The busbar voltage circuit 304 also includes a comparator 314, which compares the digital value indicative of the busbar voltage to the first threshold value. The comparator 314 provides the wakeup signal to the wireless transceiver 136 of the battery monitor 132 responsive to the digital value from the ADC 312 being greater than the first threshold value, which indicates current is being drawn from the battery module 108, sufficient to indicate that the device 102 is turning on.

In examples in which the busbar voltage circuit 304 is configured to provide the sleep signal, the comparator 314 is also configured to compare the digital value from the ADC 312 to the second threshold value. The comparator 314 provides the sleep signal to the wireless transceiver 136 of the battery monitor 132 responsive to the digital value from the ADC 312 being less than the second threshold value, which indicates that the current drawn from the battery module 108 is sufficiently low to indicate that the device 102 is entering a power save state (e.g., the EV/HEV 102 is parked). In some cases, the sleep signal is analogous to the wakeup signal being de-asserted (e.g., when the first threshold is equal to the second threshold).

In some examples, the wireless transceiver 136 includes a radio frequency (RF) core 306 and a digital core 308. The RF core 306 and the digital core 308 can be implemented as separate processors, or as separate cores of a single processor. Regardless of the particular implementation of the RF core 306 and the digital core 308, the cores 306, 308 are configured to communicate with each other.

The digital core 308 is configured to receive and process signals from the monitoring circuitry 302 (e.g., the monitoring circuitry 302 provides TX signals to the digital core 308), and to provide control signals and/or commands to the monitoring circuitry 302 (e.g., the monitoring circuitry 302 receives RX signals from the digital core 308). The digital core 308 is also configured to interface with the RF core 306, such as to facilitate wireless communications.

The RF core 306 is configured to interface with an antenna 310 of the wireless transceiver 136 to transmit and receive wireless signals, such as to facilitate wireless communication with the wireless transceiver 134 of the battery management controller 130.

In an example, when the wireless transceiver 136 is in the lower-power state, the RF core 306 provides reduced functionality (e.g., does not facilitate wireless communications). When the wireless transceiver 136 is in the higher-power state, the RF core 306 facilitates wireless communications. Accordingly, the RF core 306 consumes more power in the higher-power state of the wireless transceiver 136 than in the lower-power state of the wireless transceiver 136. Because the wireless transceiver 136 transitions to the higher-power state responsive to a physical condition occurring (e.g., a voltage sensed across the busbar 202 being greater than a threshold), the RF core 306 does not remain active in the lower-power state, such as to poll the battery management controller 130 to determine when to wake up. This enables the RF core 306 to consume less power than in a situation in which polling to wake up is used.

In some examples, when the wireless transceiver 136 is in the lower-power state, the digital core 308 is also configured to provide reduced functionality, and thus consume less power. When the wireless transceiver 136 is in the higher-power state, the digital core 308 is configured to provide its normal functionality.

In at least some examples, the wireless transceiver 136 does not provide indications of monitored parameters of the battery module 108 to the battery management controller 130 responsive to being in the lower-power state. For example, because the RF core 306 provides reduced functionality in the lower-power state, and thus consumes less power, the RF core 306 does not facilitate wireless communications (including providing indications of a monitored parameter) with the battery management controller 130. In these examples, the wireless transceiver 136 provides indications of the monitored parameters of the battery module 108 to the battery management controller 130 responsive to being in the higher power state. For example, because the RF core 306 provides normal functionality in the higher-power state, the RF core 306 facilitates wireless communications (including providing indications of a monitored parameter) with the battery management controller 130.

In some examples, the wireless transceiver 136 is configured to receive a power off command from the battery management controller 130. The power off command can be in addition to, or instead of, the sleep signal provided by the busbar voltage circuit 304. For example, because the battery management controller 130 is aware of when the EV/HEV 102 is parked, or the device 102 is in a power save mode, the battery management controller 130 is configured to issue the power off command to the wireless transceiver 136 of the battery monitor 132. The power off command causes the wireless transceiver 136 to be in (e.g., transition to, or remain in) the lower-power state.

Accordingly, the wireless transceiver 136 of the battery monitor 132 is configured to transition to a higher-power state responsive to receiving the wakeup signal, and to begin communicating with the wireless transceiver 134 of the battery management controller 130. Because the wireless transceiver 136 of the battery monitor 132 transitions to the higher-power state responsive to a physical condition (e.g., a voltage across the busbar 202) that indicates the device 102 is itself turning on, the battery monitor 132 is able to begin communicating with the battery management controller 130 relatively quickly (e.g., on the order of 50 ms from busbar 202 voltage sensing to network formation, which can be less than a polling or scanning interval) after the device 102 turns on.

In some examples, the wireless transceiver 136 of the battery monitor 132 is configured to transition to the lower-power state responsive to the wakeup signal being de-asserted, or a sleep signal being provided (e.g., the busbar 202 voltage being below the voltage threshold, indicating the device 102 is in the power save mode, or EV/HEV 102 is parked). In other examples, the wireless transceiver 136 of the battery monitor 132 is configured to transition to the lower-power state responsive to the power off command from the battery management controller 130, which is aware of the device 102 transitioning to the power save mode, or EV/HEV 102 being parked.

Accordingly, a power consumption of the battery monitor 132 is reduced responsive to the device 102 being in the power save mode (e.g., an EV/HEV 102 being parked). The battery monitor 132 power consumption is also lower than battery monitors that poll the battery management controller 130 to determine when to transition back to the higher-power state. Further, network including battery monitor(s) 132 and the battery management controller 130 is able to form relatively quickly responsive to the device 102 turning on (e.g., the EV/HEV 102 being operated by a user) because the wireless transceiver 136 of the battery monitor 132 transitions to the higher-power state responsive to a physical condition being sensed (e.g., the voltage across the busbar 202) that indicates the device 102 is turning on.

In some examples, the wireless transceiver 136 is configured to scan and/or listen on one or more RF configuration channels responsive to the wireless transceiver 136 waking up (e.g., transitioning to the higher-power state). Although the wireless transceiver 136 transitions to the higher-power state responsive to a physical condition being sensed (e.g., the voltage across the busbar 202) that indicates the device 102 is turning on, a microprocessor of the battery management controller 130 is aware of the state of the device 102 (e.g., whether the vehicle is parked, or a user desires to operate the vehicle). Accordingly, the battery management controller 130 is configured to cause its wireless transceiver 134 to enter a higher-power state responsive to the device 102 turning on. The wireless transceiver 134 is configured to send scan request(s) on the one or more RF configuration channels responsive to the wireless transceiver 134 waking up (e.g., transitioning to the higher-power state). The wireless transceiver 136 of the battery monitor 132 is configured to provide a scan response (e.g., on the one or more RF configuration channels) responsive to receiving scan request(s) from the battery management controller 130. Subsequently, communication between the battery monitor 132 and the battery management controller 130 (e.g., through their respective wireless transceivers 136, 134) occurs on an RF data channel. In some examples, a network rejoining process is avoided because data exchanged during such a process (e.g., RF data channels to be used, key values, slot numbers, and the like) are already stored in a memory (e.g., a non-volatile memory) of the battery monitor 132 and/or the battery management controller 130.

Figure 4:
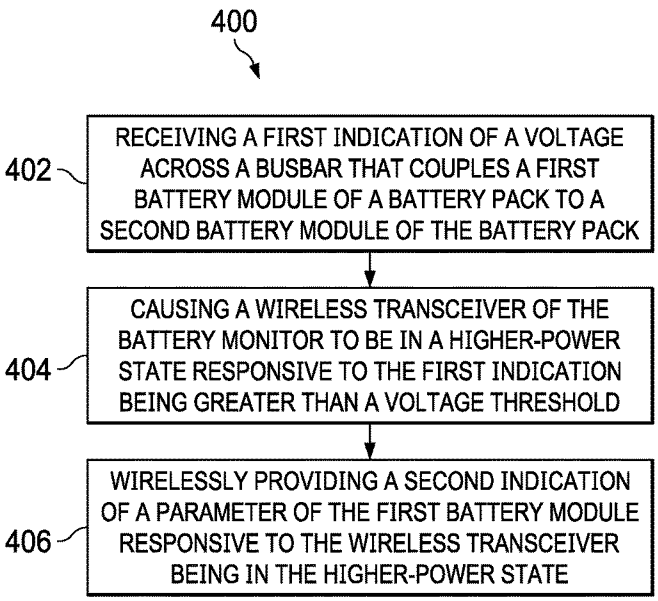
FIG. 4 is a flow chart of a method for wireless battery management in accordance with an example of this description.

FIG. 4 is a flow chart of a method 400 for wireless battery management in accordance with an example of this description. The method 400 begins in block 402 with receiving a first indication of a voltage across a busbar that couples a first battery module of a battery pack to a second battery module of the battery pack. As described above, the battery monitor 132 (or the monitoring circuitry 302 thereof) includes the busbar voltage circuit 304, which is configured to receive an indication of the voltage across the busbar 202. For example, the ADC 312 is coupled to the busbar 202 and configured to receive the voltage across the busbar 202 (e.g., which is related to a current provided by the battery module 108 and the resistance of the busbar 202). The ADC 312 provides a digital value responsive to the voltage across the busbar 202.

The method 400 continues in block 404 with causing a wireless transceiver of the battery monitor to be in a higher-power state responsive to the first indication being greater than a voltage threshold. As described above, the busbar voltage circuit 304 is configured to provide a wakeup signal (e.g., a first signal) to the wireless transceiver 136 responsive to an indication that the voltage across the busbar 202 is greater than a first threshold value (e.g., the voltage threshold). For example, the busbar voltage circuit 304 includes a comparator 314, which compares the digital value indicative of the busbar voltage to the first threshold value. The comparator 314 provides the wakeup signal to the wireless transceiver 136 of the battery monitor 132 responsive to the digital value from the ADC 312 being greater than the first threshold value, which indicates current is being drawn from the battery module 108, sufficient to indicate that the device 102 is turning on. The wakeup signal causes the wireless transceiver 136 to be in (e.g., transition to, or remain in) a higher-power state. In an example, the first threshold value to which the sensed voltage across the busbar 202 is compared is system-dependent. For example, the first threshold value is based on resistance characteristics of the busbar 202 being monitored, or an expected current drawn from the battery module 108 while the device 102 is on, or the EV/HEV 102 is operated (e.g., not in the power save state).

The method 400 continues in block 406 with wirelessly providing a second indication of a parameter of the first battery module responsive to the wireless transceiver being in the higher-power state. As described above, the battery monitor 132 includes monitoring circuitry 302, which is configured to monitor various parameter(s) of the battery module 108 (e.g., receive indications of the parameter(s)), which can include voltage, current, temperature, and parameters related to cell balancing within the battery module 108. The monitored parameters, or indications thereof, are provided by the monitoring circuitry 302 to the wireless transceiver 136, which in turn provides the indications thereof to the battery management controller 130 (e.g., wirelessly to the wireless transceiver 134 coupled to the battery management controller 130).

In at least some examples, the wireless transceiver 136 does not provide indications of monitored parameters of the battery module 108 to the battery management controller 130 responsive to being in a lower-power state. For example, because the RF core 306 provides reduced functionality in the lower-power state, and thus consumes less power, the RF core 306 does not facilitate wireless communications (including providing indications of a monitored parameter) with the battery management controller 130. In these examples, the wireless transceiver 136 provides indications of the monitored parameters of the battery module 108 to the battery management controller 130 responsive to being in the higher power state. For example, because the RF core 306 provides normal functionality in the higher-power state, the RF core 306 facilitates wireless communications (including providing indications of a monitored parameter) with the battery management controller 130.

The term "couple" is used throughout the specification. The term may cover connections, communications, or signal paths that enable a functional relationship consistent with this description. For example, if device A generates a signal to control device B to perform an action, in a first example device A is coupled to device B, or in a second example device A is coupled to device B through intervening component C if intervening component C does not substantially alter the functional relationship between device A and device B such that device B is controlled by device A via the control signal generated by device A.

A device that is "configured to" perform a task or function may be configured (e.g., programmed and/or hardwired) at a time of manufacturing by a manufacturer to perform the function and/or may be configurable (or re-configurable) by a user after manufacturing to perform the function and/or other additional or alternative functions. The configuring may be through firmware and/or software programming of the device, through a construction and/or layout of hardware components and interconnections of the device, or a combination thereof.

A circuit or device that is described herein as including certain components may instead be adapted to be coupled to those components to form the described circuitry or device. For example, a structure described as including one or more semiconductor elements (such as transistors), one or more passive elements (such as resistors, capacitors, and/or inductors), and/or one or more sources (such as voltage and/or current sources) may instead include only the semiconductor elements within a single physical device (e.g., a semiconductor die and/or integrated circuit (IC) package) and may be adapted to be coupled to at least some of the passive elements and/or the sources to form the described structure either at a time of manufacture or after a time of manufacture, for example, by an end-user and/or a third-party.

While certain components may be described herein as being of a particular process technology, these components may be exchanged for components of other process technologies. Circuits described herein are reconfigurable to include the replaced components to provide functionality at least partially similar to functionality available prior to the component replacement. Components shown as resistors, unless otherwise stated, are generally representative of any one or more elements coupled in series and/or parallel to provide an amount of impedance represented by the shown resistor. For example, a resistor or capacitor shown and described herein as a single component may instead be multiple resistors or capacitors, respectively, coupled in parallel between the same nodes. For example, a resistor or capacitor shown and described herein as a single component may instead be multiple resistors or capacitors, respectively, coupled in series between the same two nodes as the single resistor or capacitor.

Uses of the phrase "ground voltage potential" in the foregoing description include a chassis ground, an Earth ground, a floating ground, a virtual ground, a digital ground, a common ground, and/or any other form of ground connection applicable to, or suitable for, the teachings of this description. Unless otherwise stated, "about," "approximately," or "substantially" preceding a value means+/−10 percent of the stated value. Modifications are possible in the described examples, and other examples are possible within the scope of the claims.

The invention claimed is:

1. A device configurable to receive a signal from a battery module installed in a vehicle, wherein the device comprises a monitor circuit configurable to:
- compare a threshold to the signal;
- remain in a power save state when the signal is less than the threshold; and
- cause a wireless transceiver to transition from the power save state to a second power state in response to the signal exceeding the threshold,
- wherein the signal exceeding the threshold indicates that the vehicle is powering on.

2. The device of claim 1, wherein the signal is a first signal, and wherein the device further comprises an analog-to-digital converter (ADC) configurable to:
- receive the first signal; and
- output a second signal based on the first signal,
- wherein to compare the threshold to the first signal, the monitor circuit is configurable to compare the threshold to the second signal.

3. The device of claim 2, wherein the ADC is configurable to receive the first signal from a busbar on the battery module.

4. A system comprising:
- a wireless transceiver; and
- a monitor circuit coupled to the wireless transceiver and configurable to:
  - receive a signal from a battery module installed in a vehicle,
  - compare a threshold to the signal;
  - remain in a power save state when the signal is less than the threshold; and cause the wireless transceiver to transition from the power save state to a second power state in response to the signal exceeding the threshold, wherein the signal exceeding the threshold indicates that the vehicle is powering on.

5. The system of claim 4, wherein the signal is a first signal, wherein the system further comprises an analog-to-digital converter (ADC) configurable to:

receive the first signal; and output a digital value based on the first signal, wherein the monitor circuit is configurable to:

compare the threshold to the digital value; and cause the wireless transceiver to transition from the power save state to the second power state in response to the digital value exceeding the threshold.

6. The system of claim 5, wherein the ADC is configurable to receive the first signal from a busbar on the battery module.

7. The system of claim 4, wherein the wireless transceiver includes an antenna and is configurable to:

receive a command via the antenna; and enter the second power state in response to the command.

8. The system of claim 4, wherein the wireless transceiver is configurable to:

scan a radio frequency (RF) configuration channel;

receive a scan request from a controller on the RF configuration channel;

transmit a scan response to the controller on the RF configuration channel; and communicate with the controller on an RF data channel after transmitting the scan response.

9. The system of claim 4, wherein the wireless transceiver includes an antenna and is configurable to:

transmit an indication via the antenna while operating in the second power state; and refrain from transmitting the indication via the antenna while operating in the power save state.

10. A system comprising:

a primary network node; and a secondary network node including:

a wireless transceiver configurable to communicate with the primary network node; and a monitor circuit coupled to the wireless transceiver and configurable to:

receive a signal from a battery module installed in a vehicle;

compare a threshold to the signal;

remain in a power save state when the signal is less than the threshold; and cause the wireless transceiver to transition from the power save state to a second power state in response to the signal exceeding the threshold, wherein the signal exceeding the threshold indicates that the vehicle is powering on.

11. The system of claim 10, wherein the signal is a first signal, and wherein the secondary network node further comprises an analog-to-digital converter (ADC) configurable to:

receive the first signal from a busbar on the battery module; and output a digital value based on the first signal, wherein the monitor circuit is configurable to:

compare the threshold to the digital value; and cause the wireless transceiver to transition from the power save state to the second power state in response to the digital value exceeding the threshold.

12. The system of claim 10, wherein the wireless transceiver includes an antenna and is configurable to:

receive a command from the primary network node via the antenna; and enter the second power state in response to the command.

13. The system of claim 10, wherein the wireless transceiver is configurable to:

scan a radio frequency (RF) configuration channel;

receive a scan request from the primary network node a controller on the RF configuration channel;

transmit a scan response to the primary network node on the RF configuration channel; and communicate with the primary network node on an RF data channel after transmitting the scan response.

14. The system of claim 10, wherein the wireless transceiver includes an antenna and is configurable to:

transmit an indication via the antenna while operating in the second power state; and refrain from transmitting the indication via the antenna while operating in the power save state.

15. The device of claim 1, wherein the monitor circuit is configurable to:

monitor a parameter of the battery module; and cause the wireless transceiver to transmit data indicating a value of the monitored parameter to a primary network node while in the second power state.

16. The device of claim 1, wherein the monitor circuit is configurable to cause the wireless transceiver to transition from the power save state to the second power state without receiving a command from a primary network node.

17. The system of claim 4, wherein the monitor circuit is configurable to monitor a parameter of the battery module, and wherein the wireless transceiver is configurable to transmit data indicating a value of the monitored parameter to a primary network node while in the second power state.

18. The system of claim 4, wherein the monitor circuit is configurable to cause the wireless transceiver to transition from the power save state to the second power state without receiving a command from a primary network node.

19. The system of claim 10, wherein the monitor circuit is configurable to monitor a parameter of the battery module, and wherein the wireless transceiver is configurable to transmit data indicating a value of the monitored parameter to the primary network node while in the second power state.

20. The system of claim 10, wherein the monitor circuit is configurable to cause the wireless transceiver to transition from the power save state to the second power state without receiving a command from the primary network node.

* * * * *